(12) United States Patent
Gerpheide

(10) Patent No.: US 6,639,586 B2
(45) Date of Patent: Oct. 28, 2003

(54) EFFICIENT ENTRY OF CHARACTERS FROM A LARGE CHARACTER SET INTO A PORTABLE INFORMATION APPLIANCE

(75) Inventor: George Gerpheide, Salt Lake City, UT (US)

(73) Assignee: Cirque Corporation, Salt Lake City, UT (US)

( * ) Notice: Subject to any disclaimer, the term of this patent is extended or adjusted under 35 U.S.C. 154(b) by 120 days.

(21) Appl. No.: 09/833,104

(22) Filed: Apr. 11, 2001

(65) Prior Publication Data

US 2002/0000978 A1 Jan. 3, 2002

Related U.S. Application Data (60) Provisional application No. 60/195,966, filed on Apr. 11, 2000.

(51) Int. Cl.$^7$ .................................................. G09G 5/00
(52) U.S. Cl. ...................................... 345/173; 345/179
(58) Field of Search ................................. 345/179, 173, 345/168; 710/67; 340/22

(56) References Cited

U.S. PATENT DOCUMENTS

| | | | |
|---|---|---|---|
| 4,221,975 A | 9/1980 | Ledniczki et al. | |
| 5,128,672 A | 7/1992 | Kaehler | |
| 5,797,098 A | 8/1998 | Schroeder et al. | |
| 5,956,021 A * | 9/1999 | Kubota et al. | 345/179 |
| 6,008,799 A | 12/1999 | Van Kleeck | |
| 6,016,142 A | 1/2000 | Chang et al. | |
| 6,169,538 B1 * | 1/2001 | Nowlan et al. | 345/168 |
| 6,271,835 B1 * | 8/2001 | Hoeksma | 345/168 |
| 6,286,064 B1 * | 9/2001 | King et al. | 710/67 |
| 6,295,052 B1 * | 9/2001 | Kato et al. | 345/179 |

* cited by examiner

*Primary Examiner*—Amare Mengistu
(74) *Attorney, Agent, or Firm*—Morriss O'Bryant Compagni, P.C.

(57) ABSTRACT

A system for entering characters from a large character set into a small and portable information appliance such as a mobile telephone, wherein the information appliance includes a touchpad having a touch-sensitive surface, wherein the touchpad is used to enter alphanumerical data into the information appliance, wherein the characters can come from small or large character sets, and wherein characters are entered by providing a plurality of character groups, each group having a head character assigned to a specific region, and selecting a head character enables the user to cycle forwards or backwards through each of the characters within the selected character group, and selecting the desired character by raising a finger from off the touchpad surface when the desired character is found.

9 Claims, 6 Drawing Sheets

EFFICIENT ENTRY OF CHARACTERS FROM A LARGE CHARACTER SET INTO A PORTABLE INFORMATION APPLIANCE

This application claims the benefit of Provisional Application No. 60/195,966, filed Apr. 11, 2000.

THE FIELD OF THE INVENTION

This invention relates generally to entering characters in a small or portable data entry appliance which does not have a conventional keyboard. More specifically, the invention relates an efficient system for entering of characters from a large character set when the surface space that is available for entering the characters is relatively limited, such as on a cellular telephone, or into a personal digital assistant.

BACKGROUND OF THE INVENTION

The proliferation of small or portable information appliances has brought many challenges to users who want to efficiently enter data into the memory of such devices. For example, consider the many different types of personal digital assistants (PDAs) (also known as personal information managers) which help users store and organize information. Such information has included appointments, calendars, addresses and telephone numbers. However, these information appliances are now being called upon to store more and more information. And the users want to enter that information using the information appliance, instead of transferring the data from some other source. This may be attributed to the increasingly mobile society.

Data entry of alphanumerical information has always been a challenge in PDAs because there is a relatively small surface area available for data entry. For example, providing a separate key for each letter of the English alphabet and for the numbers 0 through 9 requires a significant amount of space on a small information appliance. Nevertheless, the entry of alphanumerical data is becoming increasingly important because of the Internet and other voice and data information networks.

The importance of the Internet, the e-commerce that it has generated, and new forms of communicating has created the need for other types of information appliances that can do more than store dates and addresses. For example, information appliances such as the PALM PILOT(TM) from PALM (TM), the VISOR(TM) from HANDSPRING(TM), and many others can now provide access to the Internet. Similarly, cellular telephones and digital telephone are now capable of communicating over the Internet. Accordingly, users can now send and receive email or even browse the World Wide Web using devices that were not originally intended for this purpose.

Disadvantageously, means of entering alphanumerical data continues to be a problem for such small and portable devices. One method that is used to enter alphanumerical data is through the use of a shorthand script. However, this generally requires the user to employ a small stylus, and to memorize the script. Another method includes using miniature keyboards. However, because of the available space, these keyboards generally require the use of a stylus in order to strike individual keys.

Of particular interest is the method employed by cellular telephones because they are so limited in total surface area. One relatively old system of entering characters is pressing a key that represents up to three characters. The user must select which letter among the group of letters that is to be entered by tapping once for the first letter, twice for the second letter, and three times for the third letter. However, there are some limitations to this method. For example, the letters Q and Z are not provided on a standard telephone keypad. Furthermore, there are a limited number of discrete keys. Thus while a standard telephone keypad will function for the English alphabet, it is not conducive to languages which have very large character sets that sometimes have even hundreds of different characters. The nature of discrete keys to represent characters also inherently inhibits the variety of data entry that can take place.

It would therefore be an advantage over the prior art to provide a system for entry of characters on a small or portable electronic appliance that can accommodate a large character set. It would also be an advantage to provide such a system that avoided the use of discrete keys to thereby provide a greater variety of data entry methods.

SUMMARY OF INVENTION

It is an object of the present invention to provide a method and apparatus for entering data into a small and portable information appliance.

It is another object to enable the entry of alphabetical data into the small and portable information appliance when the alphabetical character set is relatively large.

It is another object to enable the entry of alphabetical data from a large character set into small and portable information appliances that are Internet capable.

It is another object to enable the entry of alphabetical data into mobile telephones and PDAs that are Internet capable.

It is another object to enable the entry of alphabetical data into small and portable information appliances by providing a touchpad for data entry.

It is another object to provide a touchpad for entry of data from a large character set into a mobile telephone or other portable information appliance by using a touchpad that can also function as a cursor control device.

In a preferred embodiment, the present invention is a system for entering characters from a large character set into a small and portable information appliance such as a mobile telephone, wherein the information appliance includes a touchpad having a touch-sensitive surface, wherein the touchpad is used to enter alphanumerical data into the information appliance, wherein the characters can come from small or large character sets, and wherein characters are entered by providing a plurality of character groups, each group having a head character assigned to a specific region, and selecting a head character enables the user to cycle forwards or backwards through each of the characters within the selected character group, and selecting the desired character by raising a finger from off the touchpad surface when the desired character is found.

In a first aspect of the invention, a relatively small touchpad surface is disposed within the standard physical dimensions of an information appliance such as a mobile telephone.

In a second aspect of the invention, the touchpad surface is disposed within the body of the information appliance to thereby protect it, and yet is still sensitive to a pointing device as large as a finger.

In a third aspect of the invention, the touchpad surface is divided into a plurality of regions that are made sufficiently large such that a finger makes discrete contact with a single region.

These and other objects, features, advantages and alternative aspects of the present invention will become apparent to those skilled in the art from a consideration of the following detailed description taken in combination with the accompanying drawings.

DETAILED DESCRIPTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The presently preferred embodiment of the invention is a touchpad that can be disposed within the body of a digital or cellular telephone. However, it should be understood from the outset that the mobile telephone is simply typical of a small and portable information appliance that has very little surface area available for providing controls or other devices that enable data entry, and yet requires a convenient method for the entry of alphanumerical data. Other small and portable information appliances should be considered to include PDAs and other digital and analog devices that can not only store information, but can also be used to communicate with distributed computer networks, such as the Internet. Therefore, while a cellular telephone will be used to describe the preferred embodiment, the scope of application is much broader in regards to specific devices in which the present invention can be implemented. These alternative devices will be described later in greater detail.

With this understanding, the presently preferred embodiment pertains to a method and apparatus for alphanumerical data entry when a limited amount of surface area is available for the entry apparatus. The preferred embodiment comprises a touchpad. Such a touchpad is manufactured by CIRQUE CORPORATION(TM). The touchpad can utilize any appropriate sensing technology. Nevertheless, the touchpad from CIRQUE CORPORATION(TM) utilizes capacitance sensing technology, and is ideally suited to this application.

The present invention is designed to operate with any desired character set. However, for the purposes of explanation, a small character set will be used to illustrate some of the features of the invention. Thus, while the present invention is intended for large character set alphabets, the examples the follow will use English characters. However, it should be obvious that any character set from any language can be substituted without difficulty or deviation from the principles of the preferred embodiment.

Figure 1:
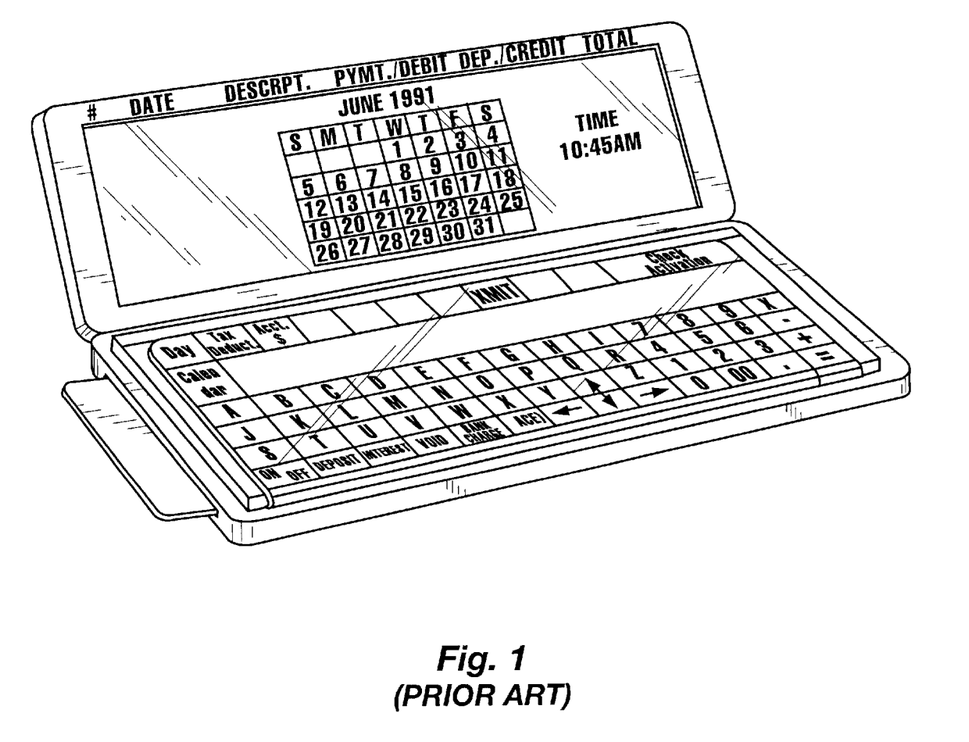
FIG. 1 is a top elevational view of a prior art keyboard having a touchpad included therein which is representative of the prior art in touchpad surfaces used as a means of input in a small and portable information appliance.
Figure 2:
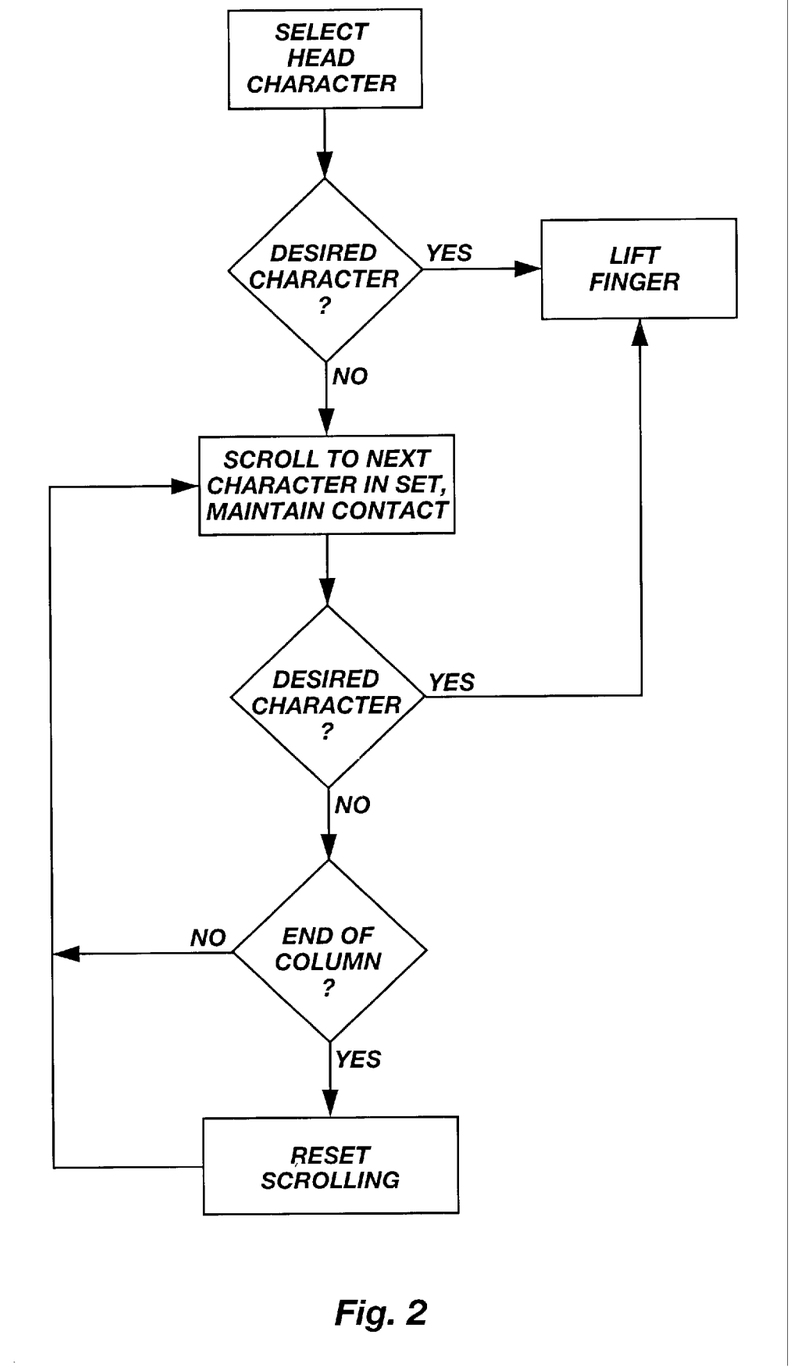
FIG. 2 is a flow chart of a presently preferred method of selecting desired characters using a touchpad.

The character set is first arranged into a number of character groups. A head character is selected to be the first character in each group. Each head character is selectable, as shown in FIG. 2, by touching an appropriate region, with only one head character being assigned to each region. The head characters will preferably appear within each region using an overlay on the touchpad surface.

It is observed that in an alternative embodiment, the head character on the overlay may represent a group of head characters, or the first head character of a sequence of head characters. Selecting the desired head character would be accomplished by tapping within the single region until the desired head character appeared on a display screen of the portable information appliance.

Returning to the preferred embodiment of FIG. 2, to enter a character, a user must first select the head character for the character group in which the desired character is located. For an example using the English alphabet, assume that there are two character groups, with the first character group comprised of the characters A, B and C, with A as the head character, and the second character group comprised of the characters D, E and F, with D as the head character. To select the character B, the user selects the region on the touchpad that contains the head character A. The user then moves the finger to another region that enables the user to cycles through all of the characters that are associated with the selected head character.

Figure 3:
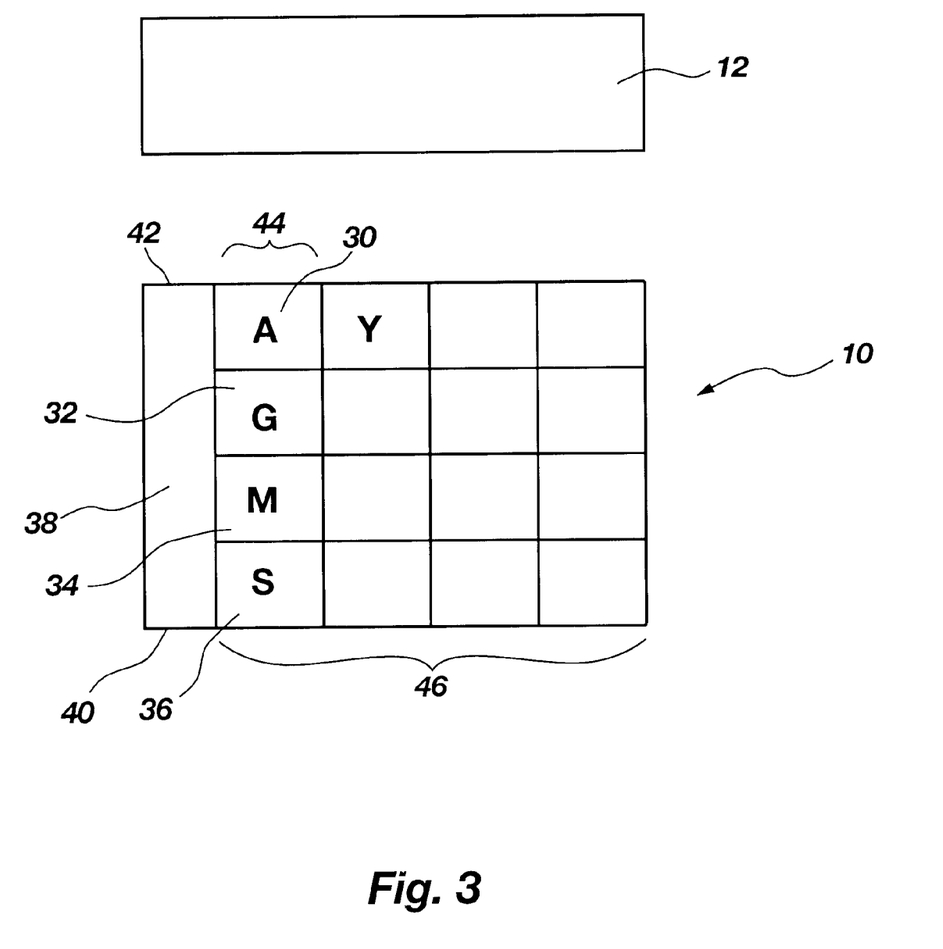
FIG. 3 is a top elevational view of a presently preferred embodiment of a touchpad surface and a display which is made in accordance with the principles of the present invention.

In order to illustrate the hardware associated with the different methods of cycling through the characters that are associated with a specific head character, FIG. 3 is provided to illustrate a touchpad having an overlay that divides the touchpad into a plurality of regions defined by lines shown thereon. In FIG. 2, assume that a character group consists of the characters A, B, C, D, E and F, with head character A. Assume that the user has selected head character A. Finally, assume that head character A is in the region designated as 30 on the touchpad 10, and that there are four regions in each column and row of the touchpad as shown in FIG. 2.

In the preferred embodiment shown in FIG. 2, the user will make contact with a head character. To cycle forwards through the characters associated with the head character, the user will slide the finger down the touchpad. To cycle backwards through the characters associated with the head character, the user will slide the finger up the touchpad. This order can be reversed if preferred.

When the user's finger reaches the bottom or the top edge of the touchpad 10, but wishes to continue moving forwards or backwards through the characters, there must be a way to enable movement in the desired direction. This movement is enabled by ignoring all lateral movement, or movement along a row. The user moves the finger to a region 38 that does not cause the currently selected character to change. The user slides the finger to the opposite end (top or bottom) of the touchpad 10, slides the finger back to the appropriate column, and continues to cycle through the characters in the desired direction.

Consider an example when after the user touches the head character A in region 30 with a finger, the user maintains contact with the touchpad 10 and slides a the finger down the touchpad surface. When the user is touching region 32 directly below region 30, a display 12 associated with the touchpad 10 will show character B.

Moving to the region 34 in the same column, the display will show character C, and moving to the bottom region 36 will cause the display to show the character D. If the character wants to select character E, the user slides the finger horizontally to the bottom 40 slide region 38. The user slides the finger up the slide region 38 until reaching the top 42 of the touchpad 10, and then moves the finger horizontally until touching the first column 44 that is adjacent to the sliding region 38. The user then slides the finger down to region 32. The display will then shown character E. Lifting the finger off the touchpad 10 at this time will enable selection of the character E.

It should be mentioned that in this preferred embodiment, all movement to select a character occurs without raising the finger from the touchpad 10 until the character to be selected is displayed.

Because of the cyclical nature of the invention, it is also possible to reach character E by movement in the opposite direction. For example, the user selects head character A in region 30. The user then slides the finger horizontally until reaching the slide region 38. The user then slides the finger vertically down to the bottom 40 of the touchpad 10. The user then moves horizontally until reaching region 36 of the first column 44. The user then slides the finger vertically up the first column 44. In region 34, the display will show character F because the user is moving backwards through the character set A, B, C, D, E, F. When the user continues up the first column 44 and is touching region 32, the display will show character E. Again, lifting the finger off the touchpad at this time will result in the selection of character E.

If the user had wanted to select the head character A, then lifting the finger off of the touchpad 10 after touching the region 30 for that head character would have immediately resulted in the selection of character A without having to move the finger into other regions.

The method of moving or scrolling through characters in a character group is also a feature of the present invention. In other words, once the user has selected a character group, the user still needs to find the desired character. Scrolling is achieved by movement along the touchpad surface. Obviously, other regions will be touched. However, no other character groups are selected because the user is now gliding a finger along the surface after initial contact. It is only initial contact with the head character region 46 that initializes selection of a new head character.

In the presently preferred embodiment, scrolling is achieved by moving vertically along the touchpad 10. When the user reaches a top edge or a bottom edge of the touchpad 10, the user may still need to continue scrolling to reach the desired character. The user then slides the finger horizontally to the sliding region of the touchpad 10 in order to cycle through other characters associated with the selected head character.

It is assumed that for the sake of convention, sliding the finger down the touchpad surface corresponds to forward movement through the selected character group. Likewise, sliding the finger up the touchpad surface corresponds to backward movement through the selected character group.

Figure 4:
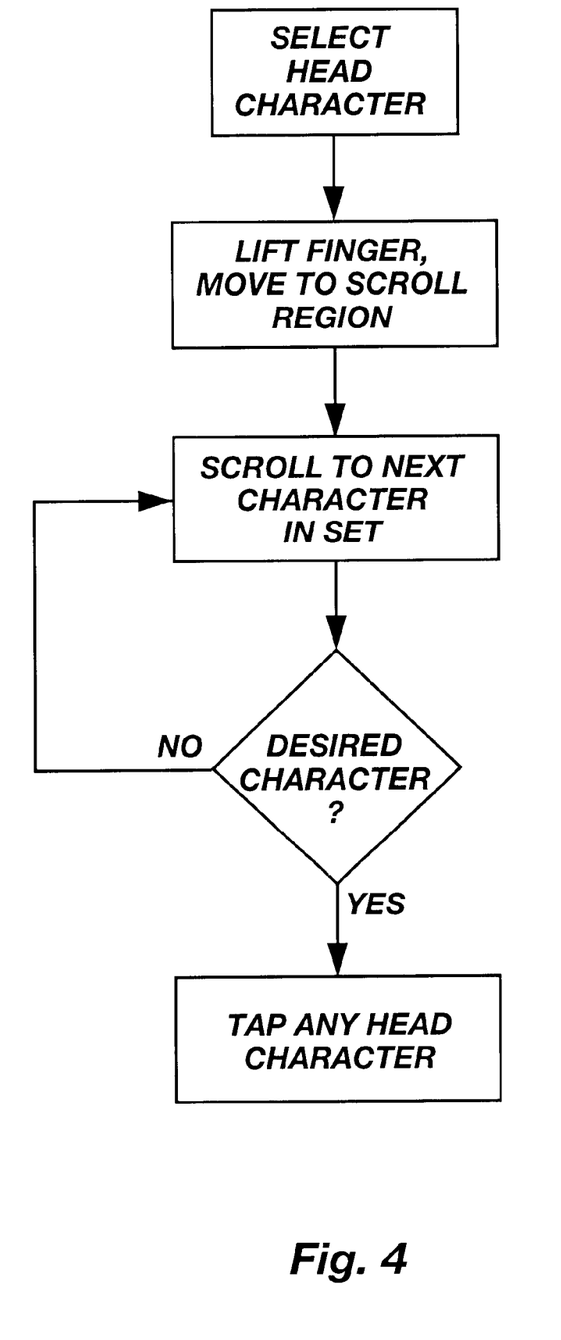
FIG. 4 is a flow chart of an alternative method of selecting desired characters using a touchpad.

The presently preferred embodiment has assumed that the user is maintaining constant contact with the touchpad 10 until the character to be selected is shown on a display. Alternatively as shown in the flowchart of FIG. 4, the user does not need to maintain contact with the touchpad 10. Consider the user who has again selected the A head character in region 30. The desired character is E. Instead of sliding the finger horizontally into the sliding region 38, the user lifts the finger after selecting the head character. The user then moves the finger above the touchpad 10 and makes contact anywhere within the sliding region 38. The user then scrolls by slides the finger up or down the sliding region 38. Lifting the finger does not result in selecting a character, so the user continues to scroll until the desired character is displayed, lifting the finger and laying it down within the sliding region 38 as often as is desired in order to display the desired character. Once the desired character is displayed, the user raises the finger off the touchpad surface, and taps any head character region.

To select a new character, the user again taps the desired head character, and repeats the process. This method has the advantage of preventing accidental selection of a character caused by accidentally lifting the finger off the touchpad. This is especially important when considering that the system is going to be operated on a mobile device. The user may be on a subway, be a passenger in a car, or some moving environment.

It is important to understand that the nature of the invention is such that there are other alternative embodiments for sliding through character sets in a cyclical manner that do not depart from the invention. For example, assume that a first portion of the touchpad surface is set aside for selecting character groups as in the preferred embodiment. However, once a character group is selected, the user moves the finger to a region of the touchpad that actually cycles through characters within the character group, instead of enabling the user to "reset" the finger as in the preferred embodiment.

Figure 5:
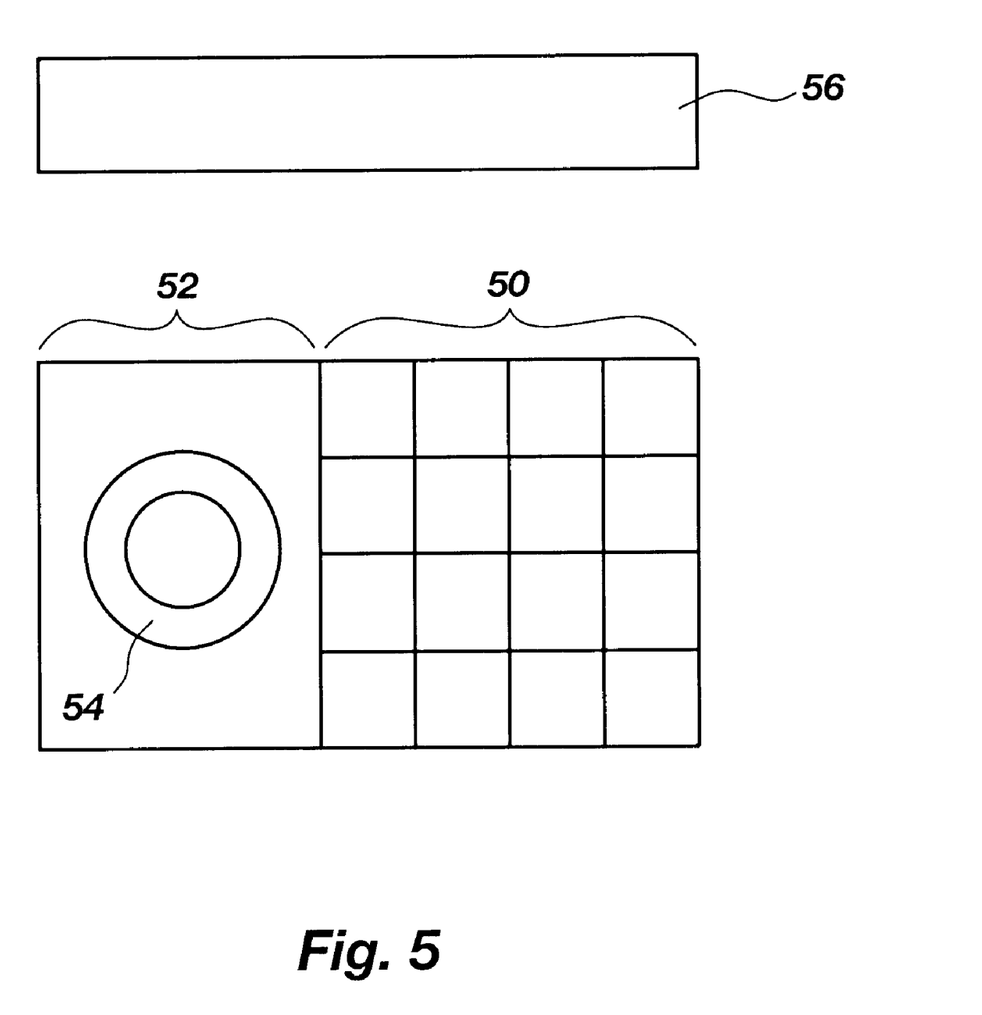
FIG. 5 is an alternative embodiment of a touchpad surface which includes at least a partially dedicated circular scrolling region.

FIG. 5 is an example of a touchpad having a region apart from the character group selection region that enables cycling through characters. FIG. 5 shows a region 50 of the touchpad 58 that is at least partially dedicated to selecting character groups. A second region 52 is at least partially dedicated to enabling cyclical movement through the character groups. Once the user selects a character group from region 50, the user moves the finger to the second region 52. The second region 52 has an overlay path or track 54 disposed thereon. The user moves the finger onto the track 54, and then move in a clockwise or counter-clockwise direction to move forwards or backwards through the character group. Once the display 56 is showing the desired character, the user lifts the finger off the track 52, and the character is selected.

This embodiment has the distinct advantage of not having to repeatedly move the finger in order to keep moving in a same direction through a character set. In other words, in order to maintain top to bottom scrolling movement with the touchpad of FIG. 3 of the preferred embodiment, the user may have to restart at the top so as to move forward through the character set several times before reaching the desired character. By providing a circular region for scrolling in FIG. 5, the user does not have to "restart," but can continuously scroll in a desired direction.

There are numerous alternative embodiments and features of the present invention that will be mentioned hereinafter. For example, the user can operate character selection without a display. Tones or a voice which tells the user what characters are being selected can provide feedback to the user. Another advantage is to mark the touchpad surface with textured surfaces to provide tactile feedback to the user. Visually markings or labeling of the touchpad surface can also benefit the user. It is noted that while use of a finger is preferred, a pointing device such as a stylus can be used.

It is envisioned that the touchpad is a touch-sensitive surface that uses capacitance technology to detect the finger. However, the touchpad surface can also use electromagnetic, pressure, electrostatic, ultrasonic, optical, resistive membrane, or other finger or stylus-responsive technology.

Another alternative embodiment provides regions that do more than select head characters. For example, the regions might respond differently depending upon the mode in which they are operating. There can also be regions that are dedicated to switching modes, or functions such as backspace keys, delete keys, cursor control regions, backarrow regions, or other important functions that are useful during data entry.

The principles of the present invention can also be applied to a digitizing tablet, as well as a touch-sensitive touchpad.

Figure 6:
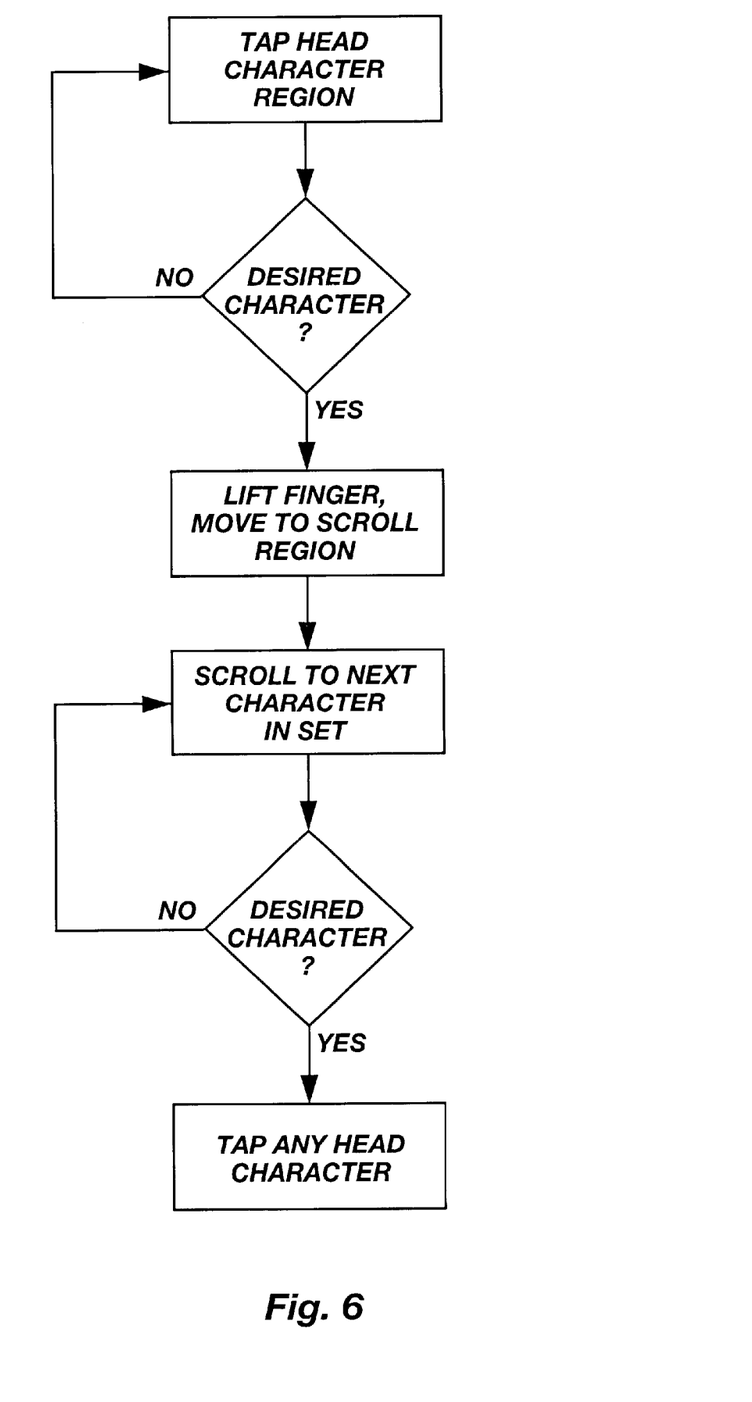
FIG. 6 is a flow chart of an alternative method of selecting desired characters using a touchpad.

In another alternative embodiment shown in the flowchart of FIG. 6, it is envisioned that more than one head character can be assigned to each region. The user would thus cycle through a plurality of different but sequential head characters, with the user tapping on a single region until the desired head character appears. Once the desired head character was found, the user would then scroll forwards or backwards through the associated character set using the sliding region 38 of FIG. 3, or the circular scrolling region 54 of FIG. 5. It is noted that this embodiment necessitates one of the alternative embodiments for character selection, and not the preferred embodiment where the user must maintain contact with the touchpad until the character to be selected is on the display.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for entering alphanumerical characters from a character set into a portable information appliance, said method including the steps of:
   1) disposing a touch-sensitive touchpad within the portable information appliance so that it functions as a data entry device therefore;
   2) providing a plurality of first regions on a surface of the touch-sensitive touchpad, wherein each of the first regions corresponds to a character group;
   3) representing each character group by a head character which is part of the character group;
   4) providing a second region that enables selection of the character from within the character group, wherein the second region includes a linear sliding region that enables cycling forwards and backwards through the character set, depending upon a direction in which the finger slides along a surface within the second region, wherein he second region is a continuous region that extends from a top edge of the touchpad to a bottom edge of the touchpad;
   5) touching one of the plurality of first regions on the touchpad with a finger to thereby select a character group;
   6) sliding the finger horizontally to the second region;
   7) sliding the finger to an opposite top or bottom edge of the touchpad;
   8) sliding the finger to a first column adjacent to the second region;
   9) sliding the finger upwards or downwards, depending upon the desired direction or scrolling through the character set; and
   10) lifting the finger from the surface of the touchpad to thereby select the desired character that appears on the display.

2. The method as defined in claim 1 wherein the method further comprises the step of providing the second region as a continuous region that extends from a left side edge of the touchpad to a right side edge of the touchpad.

3. The method as defined in claim 1 wherein the method fur her comprises the steps of:
   1) tapping one of the plurality of first regions on the touchpad with a finger to thereby select a character group;
   2) moving the finger to the second region;
   3) placing the finger back on the touchpad;
   4) sliding the finger up or down within the second region to scroll through the character set;
   5) lifting the finger off the second region, and moving to an opposite edge of the second region when an edge is reached if the desired character is not displayed within the display;
   6) repeating steps 3) through 5) until the desired character is displayed; and
   7) tapping any one of the plurality of first regions to complete selection of the displayed character.

4. The method as defined in claim 3 wherein the method further comprise the steps of:
   1) tapping a desired region of the plurality of first regions on the touchpad with a finger to thereby select a head character that represents an associated character set;
   2) repeatedly tapping the desired region of the plurality of first regions to thereby cycle through a plurality of different head characters, each having a different associated character set; and
   3) cycling through a character set when the desired head character is shown in he display.

5. The method as defined in claim 1 wherein the method further comprises the step of providing a second region that enables selection of the character from within the character group, wherein the second region includes circular sliding region that enables cycling forwards and backwards through the character set, depending upon a direction in which the finger slides along the circular sliding region.

6. The method as defined in claim 5 wherein the method further comprises the steps of:
   1) touching one of the plurality of first regions on the touchpad with a finger to thereby select a character group;
   2) maintaining co tact with the surface of the touchpad until a desired character from the selected character group appears on a display of the portable information appliance; and
   3) lifting the finger from the surface of the touchpad to thereby select the desired character that appears on the display.

7. The method as defined in claim 6 wherein the method further comprises the steps of:
   1) touching one of the plurality of first regions on the touchpad with a finger to thereby select a character group;
   2) sliding the finger horizontally to the circular sliding region;
   3) sliding the finger in a clockwise or counterclockwise direction to scroll forwards or backwards through the character set; and 4) lifting the finger from the surface of the touchpad to thereby select the desired character that appears on the display.

8. The method as defined in claim 7 wherein the method further comprises the steps of:
   1) tapping one of the plurality of first regions on the touchpad with a finger to thereby select a character group;
   2) moving the finger to the circular sliding region;
   3) placing the finger back on the touchpad;
   4) sliding the finger in a clockwise or counterclockwise direction to scroll forwards or backwards through the character set until the desired character is displayed; and
   5) tapping any on of the plurality of first regions to complete selection of he displayed character.

9. The method as defined in claim wherein the method further comprises the steps of:
   1) tapping a desired region of the plurality of first regions on the touchpad with a finger to thereby select a head character that represents an associated character set;
   2) repeatedly tapping the desired region of the plurality of first regions to thereby cycle through a plurality of different head characters, each having a different associated character set; and
   3) cycling through a character set when the desired head character is shown in he display.

* * * * *